United States Patent
Bhatia et al.

(10) Patent No.: US 11,592,812 B2
(45) Date of Patent: Feb. 28, 2023

(54) SENSOR METROLOGY DATA INTEGRATION

(71) Applicant: Applied Materials, Inc., Santa Clara, CA (US)

(72) Inventors: Sidharth Bhatia, Santa Cruz, CA (US); Garrett H. Sin, Sunnyvale, CA (US); Heng-Cheng Pai, Cupertino, CA (US); Pramod Nambiar, Santa Clara, CA (US); Ganesh Balasubramanian, Fremont, CA (US); Irfan Jamil, Santa Clara, CA (US)

(73) Assignee: Applied Materials, Inc., Santa Clara, CA (US)

(*) Notice: Subject to any disclaimer, the term of this patent is extended or adjusted under 35 U.S.C. 154(b) by 301 days.

(21) Appl. No.: 16/791,081

(22) Filed: Feb. 14, 2020

(65) Prior Publication Data
US 2020/0264335 A1 Aug. 20, 2020

Related U.S. Application Data

(60) Provisional application No. 62/807,619, filed on Feb. 19, 2019.

(51) Int. Cl.
*G05B 23/02* (2006.01)
*G05B 19/418* (2006.01)
(Continued)

(52) U.S. Cl.
CPC ....... *G05B 23/0286* (2013.01); *G05B 19/404* (2013.01); *G05B 19/4183* (2013.01);
(Continued)

(58) Field of Classification Search
CPC ...... G06N 20/00; G06N 3/08; G06F 11/3089; G06F 11/3447; G06F 11/3466;
(Continued)

(56) References Cited

U.S. PATENT DOCUMENTS 6,751,518 B1 6/2004 Sonderman
11,037,573 B2* 6/2021 Arantes .................. G06Q 50/30
(Continued)

FOREIGN PATENT DOCUMENTS

CN 101621016 A 1/2010
TW 201435969 A 9/2014
(Continued)

OTHER PUBLICATIONS

International Search Report and Written Opinion dated Jun. 11, 2020, on application No. PCT/US2020/018673.
(Continued)

*Primary Examiner* — Crystal J Barnes-Bullock
(74) *Attorney, Agent, or Firm* — Lowenstein Sandler LLP

(57) ABSTRACT

Methods, systems, and non-transitory computer readable medium are described for sensor metrology data integration. A method includes receiving sets of sensor data and sets of metrology data. Each set of sensor data includes corresponding sensor values associated with producing corresponding product by manufacturing equipment and a corresponding sensor data identifier. Each set of metrology data includes corresponding metrology values associated with the corresponding product manufactured by the manufacturing equipment and a corresponding metrology data identifier. The method further includes determining common portions between each corresponding sensor data identifier and each corresponding metrology data identifier. The method further includes, for each of the sensor-metrology matches, generating a corresponding set of aggregated sensor-metrology data and storing the sets of aggregated sensor-metrology data to train a machine learning model. The trained machine learning model is capable of generating one or more outputs for performing a corrective action associated with the manufacturing equipment.

20 Claims, 6 Drawing Sheets

(51) Int. Cl.
 *G06F 11/34*      (2006.01)
 *G06F 11/30*      (2006.01)
 *G05B 19/404*     (2006.01)
 *G06N 20/00*      (2019.01)
 *G06N 3/08*       (2023.01)

(52) U.S. Cl.
 CPC ... *G05B 19/4184* (2013.01); *G05B 19/41875* (2013.01); *G05B 19/41885* (2013.01); *G05B 23/024* (2013.01); *G05B 23/0294* (2013.01); *G06F 11/3089* (2013.01); *G06F 11/3447* (2013.01); *G06F 11/3466* (2013.01); *G06F 11/3495* (2013.01); *G05B 2219/31357* (2013.01); *G05B 2219/32194* (2013.01); *G05B 2219/32201* (2013.01); *G06N 3/08* (2013.01); *G06N 20/00* (2019.01)

(58) Field of Classification Search
 CPC ............. G06F 11/3495; G05B 19/404; G05B 19/4183; G05B 19/4184; G05B 19/41875; G05B 19/41885; G05B 2219/31357; G05B 2219/32194; G05B 2219/32201; G05B 23/024; G05B 23/0286; G05B 23/0294; G06K 9/6227; G06K 9/6228; G06K 9/6256; G06K 9/6269; G06K 9/6292; G01N 2021/8416; G01N 2021/8854; G06V 10/82; G06V 2201/06
 See application file for complete search history.

(56) References Cited

U.S. PATENT DOCUMENTS

| | | | |
|---|---|---|---|
| 11,263,737 B2* | 3/2022 | Sawlani | G06T 7/0004 |
| 11,279,032 B2* | 3/2022 | Bergantz | B25J 9/1664 |
| 2003/0182252 A1 | 9/2003 | Beinglass et al. | |
| 2007/0100487 A1 | 5/2007 | Cheng | |
| 2013/0110263 A1 | 5/2013 | Schulze | |
| 2015/0026107 A1* | 1/2015 | Vijayaraghavan | G06N 20/00 706/12 |
| 2016/0342147 A1 | 11/2016 | Iskandar et al. | |
| 2019/0036948 A1* | 1/2019 | Appel | H04L 63/1416 |
| 2019/0138415 A1 | 5/2019 | Chen et al. | |
| 2020/0104639 A1* | 4/2020 | Didari | G06N 3/0454 |
| 2020/0226742 A1 | 7/2020 | Sawlani et al. | |
| 2020/0264335 A1 | 8/2020 | Bhatia et al. | |
| 2021/0018902 A1 | 1/2021 | Yennie et al. | |
| 2021/0042570 A1* | 2/2021 | Iskandar | G06K 9/6228 |
| 2021/0088867 A1* | 3/2021 | Nagel | G01N 21/8851 |
| 2021/0116895 A1* | 4/2021 | Paul | G06F 11/3447 |
| 2022/0005713 A1* | 1/2022 | Lu | H05B 1/02 |
| 2022/0056584 A1* | 2/2022 | Agarwal | C23C 16/4401 |

FOREIGN PATENT DOCUMENTS

| | | | |
|---|---|---|---|
| TW | I488039 B | 6/2015 | |
| TW | 201705034 A | 2/2017 | |
| TW | 201712440 A | 4/2017 | |
| TW | 201817539 A | 5/2018 | |
| TW | I644190 B | 12/2018 | |
| TW | I655526 B | 4/2019 | |
| WO | 2004012230 A1 | 2/2004 | |
| WO | WO-2018204410 A1 * | 11/2018 | |
| WO | 2020172186 A1 | 8/2020 | |
| WO | 2020205339 A1 | 10/2020 | |
| WO | 2022177805 A1 | 8/2022 | |

OTHER PUBLICATIONS

International Search Report and Written Opinion dated May 23, 2022, for PCT Patent Application No. PCT/US2022/016003.
Taiwan Search Report received form Taiwan Application No. 109105293, dated Mar. 14, 2022.

* cited by examiner

SENSOR METROLOGY DATA INTEGRATION

RELATED APPLICATION

This application claims the benefit of U.S. Provisional Application No. 62/807,619, filed Feb. 19, 2019, the entire content of which is hereby incorporated by reference.

TECHNICAL FIELD

The present disclosure relates to data integration, and, more particularly, sensor metrology data integration.

BACKGROUND

Products may be produced by performing one or more manufacturing processes using manufacturing equipment. For example, semiconductor manufacturing equipment may be used to produce wafers via semiconductor manufacturing processes. Sensors may be used to determine manufacturing parameters of the manufacturing equipment during the manufacturing processes. Metrology equipment may be used to determine property data of the products that were produced by the manufacturing equipment.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method may include receiving a plurality of sets of sensor data. Each set of sensor data may include corresponding sensor values associated with producing corresponding product by manufacturing equipment and a corresponding sensor data identifier. The method may further include receiving a plurality of sets of metrology data. Each set of metrology data may include corresponding metrology values associated with the corresponding product manufactured by the manufacturing equipment and a corresponding metrology data identifier. The method may further include determining common portions between each corresponding sensor data identifier and each corresponding metrology data identifier to identify sensor-metrology matches. The method may further include, for each of the sensor-metrology matches, generating a corresponding set of aggregated sensor-metrology data that includes a respective set of sensor data that corresponds to the corresponding sensor data identifier and a respective set of metrology data that corresponds to the corresponding metrology data identifier to generate a plurality of sets of aggregated sensor-metrology data. The method may further include storing the plurality of sets of aggregated sensor-metrology data to train a machine learning model to provide a trained machine learning model. The trained machine learning model is capable of generating one or more outputs for performing a corrective action associated with the manufacturing equipment.

BRIEF DESCRIPTION OF THE DRAWINGS

The present disclosure is illustrated by way of example, and not by way of limitation in the figures of the accompanying drawings.

DETAILED DESCRIPTION

Figure 1:
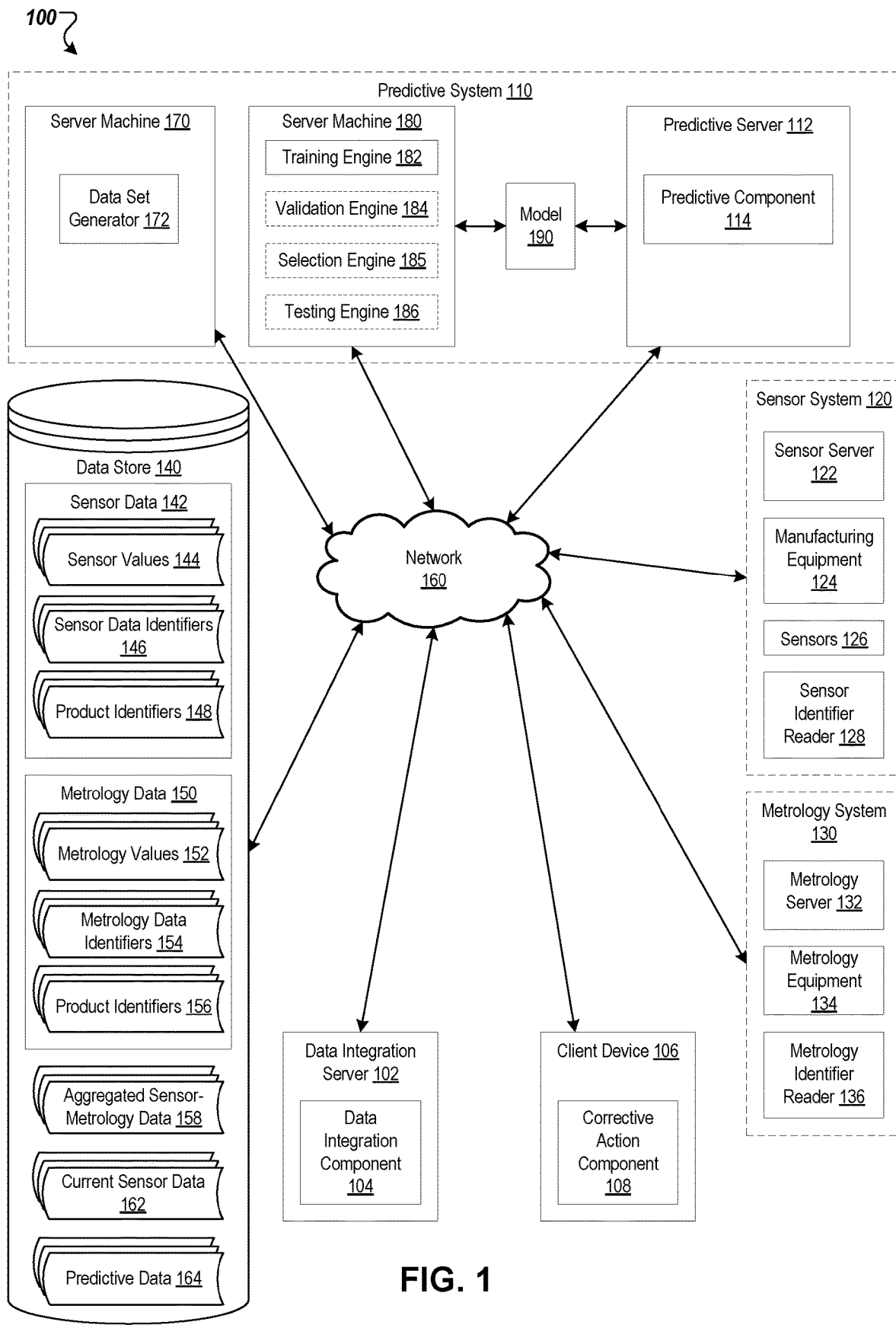
FIG. 1 is a block diagram illustrating an exemplary system architecture, according to certain embodiments.

Described herein are technologies directed to sensor metrology data integration. Manufacturing equipment may be used to perform manufacturing processes to produce products. Sensors may provide sensor values for determining manufacturing parameters of the manufacturing equipment during the manufacturing processes. The sensor values may be stored in a first location. Metrology equipment may provide metrology values for determining property data of the products that were produced by the manufacturing equipment. The metrology values may be stored in a second location. For further analysis (e.g., training a model for supervised machine learning, etc.), subsets of the sensor values that correspond to products are to be associated with corresponding subsets of metrology values that correspond to the same products (e.g., sensor values for producing a wafer are to be associated with metrology values of the wafer).

In one conventional approach, a process engineer may periodically keep log sheets, where the process engineer has manually associated subsets of the sensor values with corresponding subsets of the metrology values that correspond to the same products. Manual association of sensor data and metrology data has errors, takes a lot of user time, and is inefficient. Conventionally, manual association of sensor data and metrology data is performed for only a small portion of the overall sensor and metrology values generated. The manually associated sensor and metrology values for a small portion of the overall sensor and metrology values may not be sufficient for further analysis.

In another conventional approach, each product has a visible product identifier (e.g., wafer scribe) and an image is taken of each product during manufacturing (the product identifier is shown in the image) and an image is taken of each product during metrology (the product identifier is shown in the image). An optical character recognition (OCR) system is used to optically recognize each of the wafer identifiers in the images associated with manufacturing and the images associated with metrology. Subsets of the sensor values and subsets of the metrology values that have the same optically-read product identifiers are then associated with each other. The association of sensor data and metrology data using an OCR system has errors due to errors in optically reading product identifiers, is to have an increased storage space for storing the images, has increased processor overhead and energy consumption to perform the optical character recognition, and is expensive.

The devices, systems, and methods disclosed herein use sensor metrology data integration to associate sensor data and metrology data. A processing device receives sets of sensor data and sets of metrology data. Each set of sensor data includes corresponding sensor values associated with producing corresponding product by manufacturing equipment and a corresponding sensor data identifier. Each set of metrology data includes corresponding metrology values associated with the corresponding product manufactured by the manufacturing equipment and a corresponding metrology data identifier. The processing device determines common portions between each corresponding sensor data identifier and each corresponding metrology data identifier to identify sensor-metrology matches. For each of the sensor-metrology matches, the processing device generates a corresponding set of aggregated sensor-metrology data (e.g., an aggregated sensor-metrology data structure or data table) that includes a respective set of sensor data that corresponds to the corresponding sensor data identifier and a respective set of metrology data that corresponds to the corresponding metrology data identifier. The processing device stores the sets of aggregated sensor-metrology data. In some embodiments, the sets of aggregated sensor-metrology data are stored in a database that is to be searched based on sensor data or metrology data to determine optimal manufacturing parameters (e.g., sensor data corresponding to the searched metrology data) or optimal product property data (e.g., metrology data corresponding to the searched sensor data). In some embodiments, the stored sets of aggregated sensor-metrology data may be used to train a machine learning model.

In some embodiments, the output of the trained machine learning model is used to perform a corrective action associated with the manufacturing equipment. In some embodiments, the output of the trained machine learning model is used to determine virtual metrology data. In some embodiments, the trained machine learning model is used to determine optimal design of the manufacturing equipment and/or manufacturing processes.

Aspects of the present disclosure result in technological advantages of significant reduction in energy consumption (e.g., battery consumption), bandwidth used, processor overhead, and so forth. In some embodiments, the technological advantages result from generating sets of aggregated sensor-metrology data without manually associating the sensor data and metrology data and without using an OCR system to associate the sensor data and the metrology data. The generating of the sets of aggregated sensor-metrology data has fewer errors and does not use the user time compared to manually associating sensor data and metrology data. The generating of the sets of aggregated sensor-metrology data has less errors, does not use as much storage space, does not use as much processor overhead and energy consumption, does not use as much bandwidth (compared to transmitting images and OCR data), and is less expensive compared to using an OCR system to associate sensor data and metrology data. The use of the aggregated-sensor metrology data, as disclosed herein, (that is generated faster and has less errors that conventional approaches) to train a machine learning model to perform a corrective action associated with manufacturing equipment) causes corrective actions to be performed more rapidly and with less errors that conventional approaches.

FIG. 1 is a block diagram illustrating an exemplary system architecture 100, according to certain embodiments. The system architecture 100 includes a data integration server 102, a client device 106, a sensor system 120, a metrology system 130, a predictive server 112, and a data store 140. The predictive server 112 may be part of a predictive system 110. The predictive system 110 may further include server machines 170 and 180. The sensor system may 120 include a sensor server 122 (e.g., field service server (FSS) at a manufacturing facility), manufacturing equipment 124, sensors 126, and sensor identifier reader 128 (e.g., front opening unified pod (FOUP) radio frequency identification (RFID) reader for sensor system 120). The metrology system 130 may include a metrology server 132 (e.g., metrology database, metrology folders, etc.), metrology equipment 134, and metrology identifier reader 136 (e.g., FOUP RFID reader for metrology system 130).

The sensors 126 may provide sensor values 144 (e.g., manufacturing parameters) associated with producing corresponding product (e.g., wafers) by manufacturing equipment 124. The sensor values 144 may include a value of one or more of temperature (e.g., heater temperature), spacing (SP), pressure, high frequency radio frequency (HFRF), voltage of electrostatic chuck (ESC), electrical current, flow, power, voltage, etc. Sensor values 144 may be associated with or indicative of manufacturing parameters such as hardware parameters (e.g., settings or components (e.g., size, type, etc.) of the manufacturing equipment 124) or process parameters of the manufacturing equipment. The sensor values 144 may be provided while the manufacturing equipment 124 is performing manufacturing processes (e.g., equipment readings when processing wafers). The sensor values 144 may be different for each product (e.g., each wafer).

The sensor identifier reader 128 (e.g., FOUP RFID reader for sensor system 120) may provide a sensor carrier identifier (e.g., FOUP identifier, wafer carrier identifier, slot identifier, etc.). The sensor server 122 may generate a sensor data identifier 146 that includes the sensor carrier identifier and a timestamp (e.g., date, time, etc.). A sensor carrier identifier may be a carrier identifier (e.g., FOUP identifier, etc.) identified by the sensor system 120 (e.g., via sensor identifier reader 128). The sensor server 122 may generate sensor data 142 that includes sensor values 144 and a sensor data identifier 146. In some embodiments, the sensor data 142 (e.g., sensor data identifiers 146) further includes product identifiers 148. For example, multiple products (e.g., twenty-five wafers) may be associated with the same sensor carrier identifier and each product identifier 148 may indicate the order of the products (e.g., first wafer, second wafer, etc. in the wafer carrier).

The metrology equipment 134 may provide metrology values 152 (e.g., property data of wafers) associated with products (e.g., wafers) produced by the manufacturing equipment 124. The metrology values 152 may include a value of one or more of film property data (e.g., wafer spatial film properties), dimensions (e.g., thickness, height, etc.), dielectric constant, dopant concentration, density, defects, etc. The metrology values 152 may be of a finished or semi-finished product. The metrology values 152 may be different for each product (e.g., each wafer).

The metrology identifier reader 136 (e.g., FOUP RFID reader for metrology system 130) may provide a metrology carrier identifier (e.g., FOUP identifier, wafer carrier identifier, slot identifier, etc.). A metrology carrier identifier may be a carrier identifier (e.g., FOUP identifier, etc.) identified by the metrology system 130 (e.g., via metrology identifier reader 138). The metrology carrier identifier and the sensor carrier identifier that correspond to the same products (e.g., same wafers) may be the same carrier identifier (e.g., same FOUP ID) and correspond to the same carrier (e.g., the same FOUP). The metrology server 132 may generate metrology data identifiers 154 that include the metrology carrier identifier and a timestamp (e.g., date stamp, etc.). The metrology server 132 may generate metrology data 150 that includes metrology values 152 and a metrology data identifier 154. In some embodiments, the metrology data 150 further includes product identifiers 156. For example, multiple products (e.g., twenty-five wafers) may be associated with the same metrology data identifier 154 (e.g., wafer carrier identifier) and each product identifier 156 may indicate the order of the products (e.g., first wafer, second wafer, etc. in the wafer carrier).

In some embodiments, a product carrier (e.g., FOUP, wafer carrier) may transfer the products from the manufacturing equipment 124 to the metrology equipment 134. The products may maintain the same order (e.g., same location in the FOUP or wafer carrier) in the sensor system 120 and in the metrology system 130. For example, wafers may be loaded into and out of the manufacturing equipment 124 (e.g., for processing of the wafers and providing sensor data 142 via sensor server 122) in the same order as they are loaded into and out of metrology equipment 134 (e.g., for providing metrology data 150 via metrology system 130). In some embodiments, the sensor carrier identifier (e.g., FOUP ID associated with sensor system 120) and the metrology carrier identifier (e.g., FOUP ID associated with metrology system 130) that correspond to the same products are associated with the same product carrier (e.g., the same FOUP) and/or carrier identifier (e.g., the sensor carrier identifier and the metrology carrier identifier are the same).

The data integration server 102, client device 106, sensor system 120 (e.g., sensor server 122, manufacturing equipment 124, sensors 126, sensor identifier reader 128, etc.), metrology system 130 (e.g., metrology server 132, metrology equipment 134, metrology identifier reader 136, etc.), predictive server 112, data store 140, server machine 170, and server machine 180 may be coupled to each other via a network 160 for generating aggregated sensor-metrology data 158 to perform corrective actions. In some embodiments, network 160 is a public network that provides client device 106 with access to the predictive server 112, data store 140, and other publically available computing devices. In some embodiments, network 160 is a private network that provides data integration server 102 access to the sensor system 120, metrology system 130, data store 140, and other privately available computing devices and that provides client device 106 access to the predictive server 112, data store 140, and other privately available computing devices. Network 160 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 106 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The client device 106 may be capable of receiving an indication associated with manufacturing equipment 124 (e.g., user input requesting predictive data 164 for manufacturing equipment 124, user input regarding corrective action associated with the manufacturing equipment 124), obtaining current sensor data 162 associated with the manufacturing equipment 124 (e.g., from data store 140, from sensor system 120, etc.), providing the current sensor data 162 associated with the manufacturing equipment 124 to the predictive system 110, receiving output (e.g., predictive data 164) from the predictive system 110, and causing a corrective action (e.g., based on the output) associated with the manufacturing equipment 124. Each client device 106 may include an operating system that allows users to one or more of generate, view, or edit data (e.g., indication associated with manufacturing equipment 124, corrective actions associated with manufacturing equipment 124, etc.).

In some embodiments, the metrology data 150 corresponds to historical property data of products (e.g., produced using manufacturing parameters associated with sensor data 142) and the predictive data 164 corresponds to predicted property data (e.g., of products to be produced or that have been produced using the current sensor data 162). In some embodiments, the predictive data 164 is predicted metrology data (e.g., virtual metrology data) of the products to be produced or that have been produced using the current sensor data 162.

Performing metrology can be costly in terms of time required, metrology equipment 134 used, energy consumed, bandwidth used to send the metrology data, processor overhead to process the metrology data, etc. By inputting current sensor data 162 (e.g., manufacturing parameters that are to be used to manufacture a product) and receiving output of predicted property data, system 100 can have the technical advantage of avoiding the costly process of using metrology equipment 134 to generate metrology values for current sensor data 162.

Performing manufacturing processes the result in defective products can be costly in time, energy, and manufacturing equipment 124 used to make the defective products, the cost of identifying the defects and discarding the defective product, etc. By inputting current sensor data 162 (e.g., manufacturing parameters that are to be used to manufacture a product), receiving output of predicted property data, and performing a corrective action based on the predicted property data, system 100 can have the technical advantage of avoiding the cost of producing, identifying, and discarding defective products.

Performing manufacturing processes the result in failure of the components of the manufacturing equipment 124 can be costly in downtime, damage to products, damage to equipment, express ordering replacement components, etc. By inputting current sensor data 162 (e.g., manufacturing parameters that are to be used to manufacture a product), receiving output of predicted property data, and performing corrective action (e.g., predicted operational maintenance, such as replacement, processing, cleaning, etc. of components) based on the predicted property data, system 100 can have the technical advantage of avoiding the cost of unexpected component failure.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting the target property data (e.g., target metrology data for the products) (e.g., into the trained machine learning model 190) and receiving an output of optimal manufacturing parameters for the target property data, system 100 can have the technical advantage of using optimal manufacturing parameters (e.g., hardware parameters, process parameters, optimal design) to avoid costly results of suboptimal manufacturing parameters Corrective action may be associated with one or more of computational process control (CPC), statistical process control (SPC), automatic process control (APC), preventative operative maintenance, design optimization, updating of manufacturing parameters, feedback control, machine learning modification, etc.

Sensor data 142 may be associated with manufacturing processes of manufacturing equipment 124 and metrology data 150 may be associated with properties of the finished product produced by the manufacturing processes. For example, the manufacturing equipment may be a drilling machine and the manufacturing processes may be drilling a hole in a product. The sensor data 142 may indicate the drill rotation, the drill bit age, the rate of drill insertion, and the rate of drill removal. The metrology data 150 may indicate a hole diameter, a hole depth, and a hole roundness. The machine learning model 190 may be trained based on data input of sensor data 142 associated with drilling holes in products and target output of the metrology data 150 associated with the drilled holes. The trained machine learning model 190 may receive input of current sensor data 162 (e.g., drill rotation, drill bit age, rate of drill insertion/removal, etc.) that is to be used for drilling holes. Based on the input of the current sensor data 162, the trained machine learning model 190 may generate output of predictive data 164 (e.g., predicted properties of products manufactured (holes drilled) using the current sensor data 162). Based on the output (e.g., predictive data 164), the client device 106 (e.g., via corrective action component 108) may cause a corrective action to be performed.

In some embodiments, the corrective action is providing an alert (e.g., an alarm to stop or not perform the manufacturing process if the predictive data 164 indicates the hole is predicted to not be round). In some embodiments, the corrective action is providing feedback control (e.g., modifying a manufacturing parameter to slow down the drill removal responsive to the predictive data 164 indicating the hole is predicted to not be round). In some embodiments, the corrective action is providing machine learning (e.g., modifying one or more manufacturing parameters, such as drill rotation, rate of insertion, rate of removal, etc. based on the predictive data 164). In some embodiments, the corrective action is causing updates to one or more manufacturing parameters.

Manufacturing parameters may include hardware parameters (e.g., replacing components, using certain components, etc.) and/or process parameters (e.g., temperature, pressure, flow, rate, etc.). In some embodiments, the corrective action is causing preventative operative maintenance (e.g., replace, process, clean, etc. components of the manufacturing equipment 124). In some embodiments, the corrective action is causing design optimization (e.g., updating manufacturing parameters, manufacturing processes, manufacturing equipment 124, etc. for an optimized product).

The client device 106 may include a corrective action component 108. Corrective action component 108 may receive user input (e.g., via a GUI displayed via the client device 106) of an indication associated with manufacturing equipment 124. In some embodiments, the corrective action component 108 transmits the indication to the predictive system 110, receives output (e.g., predictive data 164) from the predictive system 110, determines a corrective action based on the output, and causes the corrective action to be implemented. In some embodiments, the corrective action component 108 transmits the indication associated with manufacturing equipment 124 to the predictive system 110, receives an indication of a corrective action from the predictive system 110, and causes the corrective action to be implemented.

The data integration server 102, predictive server 112, sensor server 122, metrology server 132, server machine 170, and server machine 180 may each include one or more computing devices such as a rackmount server, a router computer, a server computer, a personal computer, a mainframe computer, a laptop computer, a tablet computer, a desktop computer, graphics processing unit (GPU), accelerator application-specific integrated circuit (ASIC) (e.g., tensor processing unit (TPU)), etc.

The data integration server 102 may include a data integration component 104. The data integration component 104 may receive sets of sensor data 142 (e.g., from the sensor server 122, from the data store 140) and sets of metrology data 150 (e.g., from the metrology server 132, from the data store 140), determine sensor-metrology matches between the sets of sensor data 142 and the sets of metrology data 150, generate sets of aggregated sensor-metrology data 158 based on the sensor-metrology matches, and store the sets of aggregated sensor-metrology data 158 in the data store 140.

The predictive server 112 may include a predictive component 114. In some embodiments, the predictive component 114 may retrieve aggregated sensor-metrology data 158 and current sensor data 162 from the data store and generate output (e.g., predictive data 164) for performing corrective action associated with the manufacturing equipment 124 based on the aggregated sensor-metrology data 158 and current sensor data 162. In some embodiments, the predictive component 114 may use a trained machine learning model 190 to determine the output for performing the corrective action based on the current sensor data 162. The trained machine learning model 190 may be trained using the aggregated sensor-metrology data 158 to learn key process and hardware parameters. Generating, by the trained machine learning model 190, output for performing corrective action may include prescribing, by the trained machine learning model 190, optimal operating conditions (e.g., process parameters) and/or space (e.g., hardware parameters). In some embodiments, the predictive component 114 determines predictive data 164 for performing corrective action by providing current sensor data 162 into the trained machine learning model 190, obtaining output from the trained machine learning model 190, and determining predictive data 164 based on the output.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, metrology data 150, aggregated sensor-metrology data 158, current sensor data 162, and predictive data 164 (e.g., predicted metrology data). The sensor data 142, metrology data 150, and aggregated sensor-metrology data 158 may be historical data (e.g., for training the machine learning model 190). The current sensor data 162 may be sensor data (e.g., subsequent to the sensor data 142) for which predictive data 164 is to be generated (e.g., for performing corrective actions based on the historical data).

Sensor data 142 may include sensor values, sensor data identifiers 146, and product identifiers 148. Metrology data 150 may include metrology values 152, metrology data identifiers 154, and product identifiers 156. Each instance (e.g., set) of sensor data 142 may correspond to a corresponding product carrier (e.g., associated with a sensor data identifier 146), a corresponding timestamp (e.g., associated with the sensor data identifier 146), and/or a corresponding product (e.g., associated with a product identifier 148). Each instance (e.g., set) of metrology data 150 may correspond to a corresponding product carrier (e.g., associated with a metrology data identifier 154), a corresponding timestamp (e.g., associated with the metrology data identifier 154), and/or a corresponding product (e.g., associated with a product identifier 156).

In some embodiments, the client device 106 may store current sensor data (e.g., sensor data received after the generating of the aggregated sensor-metrology data 158, sensor data for which there is no metrology data) in the data store 140 and the predictive server 112 may retrieve the current sensor data from the data store 140. In some embodiments, the predictive server 112 may store output (e.g., predictive data 164) of the trained machine learning model 190 in the data store 140 and the client device 106 may retrieve the output from the data store 140.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model 190. Some operations of data set generator 172 are described in detail below with respect to FIGS. 2 and 5. In some embodiments, the data set generator 172 may partition the aggregated sensor-metrology data 158 into a training set (e.g., sixty percent of the aggregated sensor-metrology data 158), a validating set (e.g., twenty percent of the aggregated sensor-metrology data 158), and a testing set (e.g., twenty percent of the aggregated sensor-metrology data 158). In some embodiments, the predictive system 110 (e.g., via predictive component 114) generates multiple sets of features. For example a first set of features may be a first set of sensor data (e.g., from a first set of sensors) that correspond to each of the data sets (e.g., training set, validation set, and testing set) and a second set of features may be a second set of types of sensor data (e.g., from a second set of sensors different from the first set of sensors) that correspond to each of the data sets.

Server machine 180 includes a training engine 182, a validation engine 184, selection engine, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a machine learning model 190 using one or more sets of features associated with the training set from data set generator 172. The training engine 182 may generate multiple trained machine learning models 190, where each trained machine learning model 190 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. The machine learning model 190 may use one or more of linear regression, random forest, neural network (e.g., artificial neural network), etc.

Predictive component 114 may provide current sensor data 162 to the trained machine learning model 190 and may run the trained machine learning model 190 on the input to obtain one or more outputs. The predictive component 114 may be capable of determining (e.g., extracting) predictive data 164 from the output of the trained machine learning model 190 and may determine (e.g., extract) confidence data from the output that indicates a level of confidence that the predictive data 164 corresponds to the products produced or to be produced using the manufacturing equipment 124 at the current sensor values. The predictive component 114 or corrective action component 108 may use the confidence data to decide whether to cause a corrective action associated with the manufacturing equipment 124 based on the predictive data 164.

The confidence data may include or indicate a level of confidence that the predictive data 164 corresponds to property data of the products associated with the current sensor data 162. In one example, the level of confidence is a real number between 0 and 1 inclusive, where 0 indicates no confidence that the predictive data 164 corresponds to property data of the products associated with the current sensor data 162 and 1 indicates absolute confidence that the predictive data 164 corresponds to property data of the products associated with the current sensor data 162. In some embodiments, the system 100 may use predictive system 110 to determine predictive data 164 instead of using the metrology equipment 134 to determine metrology data. In some embodiments, responsive to the confidence data indicating a level of confidence that is below a threshold level, the system 100 may cause the metrology equipment 134 to generate the metrology data. Responsive to the confidence data indicating a level of confidence below a threshold level for a predetermined number of instances (e.g., percentage of instances, frequency of instances, total number of instances, etc.) the predictive component 114 may cause the trained machine learning model 190 to be re-trained (e.g., based on the current sensor data 162 and metrology data that corresponds to the current sensor data 162, etc.).

For purpose of illustration, rather than limitation, aspects of the disclosure describe the training of a machine learning model using aggregated sensor-metrology data 158 and inputting current sensor data 162 into the trained machine learning model to determine predictive data 164. In other implementations, a heuristic model or rule-based model is used to determine predictive data 164 (e.g., without using a trained machine learning model). Predictive component 114 may monitor aggregated sensor-metrology data 158. Any of the information described with respect to data inputs 210 of FIG. 2 may be monitored or otherwise used in the heuristic or rule-based model.

In some embodiments, the functions of data integration server 102, client device 106, predictive server 112, sensor server 122, metrology server 132, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, sensor server 122, metrology server 132, and data integration server 102 may be integrated into a single machine.

In general, functions described in one embodiment as being performed by data integration server 102, client device 106, predictive server 112, sensor server 122, metrology server 132, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data. In another example, client device 106 may determine the predictive data 164 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of generating aggregated sensor-metrology data 158 to perform a corrective action in manufacturing facilities (e.g., semiconductor manufacturing facilities), embodiments may also be generally applied to aggregating types of data to perform an action. Embodiments may be generally applied to integrating different types of data. For example, sensor data may be aggregated with corresponding component failure data for predicting end of life of components. In another example, images may be aggregated with corresponding image classification for predicting image classification of images.

Figure 2:
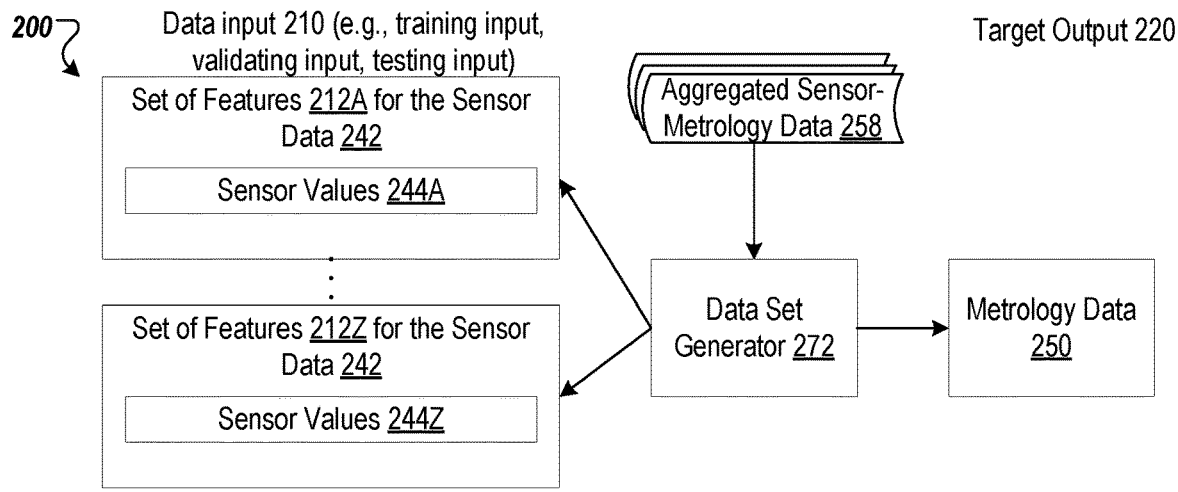
FIG. 2 is an example data set generator to create data sets for a machine learning model, according to certain embodiments.

FIG. 2 is an example data set generator 272 (e.g., data set generator 172 of FIG. 1) to create data sets for a machine learning model (e.g., model 190 of FIG. 1) using aggregated sensor-metrology data 258 (e.g., aggregated sensor-metrology data 158 of FIG. 1), according to certain embodiments. System 200 of FIG. 2 shows data set generator 272, data inputs 210, and target output 220.

In some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set may also include mapping data that maps the data inputs 210 to the target outputs 220. Data inputs 210 may also be referred to as "features," "attributes," or information." In some embodiments, data set generator 272 may provide the data set to the training engine 182, validating engine 184, or testing engine 186, where the data set is used to train, validate, or test the machine learning model 190. Some embodiments of generating a training set may further be described with respect to FIG. 5.

In some embodiments, data set generator 272 receives the aggregated sensor-metrology data 258 and generates the data input 210 (e.g., sensor data 242) and target output 220 (e.g., metrology data 250) based on the aggregated sensor-metrology data 258. The data set generator 272 may determine the mapping from each set of the sensor data 242 to each set of the metrology data 250 based on the aggregated sensor-metrology data 258. For example, for each of the sets of aggregated sensor-metrology data 258, the data set generator 272 may receive a corresponding set of aggregated sensor-metrology data 258 in a data structure (e.g., table format), extract the corresponding set of sensor data 242 from the data structure to use in the data input 210, extract the corresponding set of metrology data 250 from the data structure for use in the target output 220, and maintain mapping of the corresponding sensor data 242 to the corresponding metrology data 250 (e.g., from the same data structure).

In some embodiments, data inputs 210 may include one or more sets of features 212A-212Z for the sensor data 242 (e.g., sensor data 142 of FIG. 1, including sensor values 244A-244Z). Each instance of sensor data 242 may include sensor data from one or more types of sensors. Target output 220 may include metrology data 250 (e.g., metrology data 150 of FIG. 1).

In some embodiments, data set generator 272 may generate a first data input corresponding to a first set of features 212A to train, validate, or test a first machine learning model and the data set generator 272 may generate a second data input corresponding to a second set of features 212B to train, validate, or test a second machine learning model.

In some embodiments, the data set generator 272 may discretize one or more of the data input 210 or the target output 220 (e.g., to use in classification algorithms for regression problems). Discretization of the data input 210 or target output 220 may transform continuous values of variables into discrete values. In some embodiments, the discrete values for the data input 210 indicate discrete manufacturing parameters to obtain a target output 220 (e.g., discrete property data).

Data inputs 210 and target outputs 220 to train, validate, or test a machine learning model may include information for a particular facility (e.g., for a particular semiconductor manufacturing facility). For example, the sensor data 242 and metrology data 250 may be for the same manufacturing facility.

In some embodiments, the information used to train the machine learning model may be from specific types of manufacturing equipment 124 of the manufacturing facility having specific characteristics and allow the trained machine learning model to determine outcomes for a specific group of manufacturing equipment 124 based on input for current sensor data 162 associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing machine learning model 190 using the data set, the machine learning model 190 may be further trained, validated, or tested (e.g., current sensor data 162 of FIG. 1 and current metrology data) or adjusted (e.g., adjusting weights associated with input data of the machine learning model 190, such as connection weights in a neural network).

Figure 3:
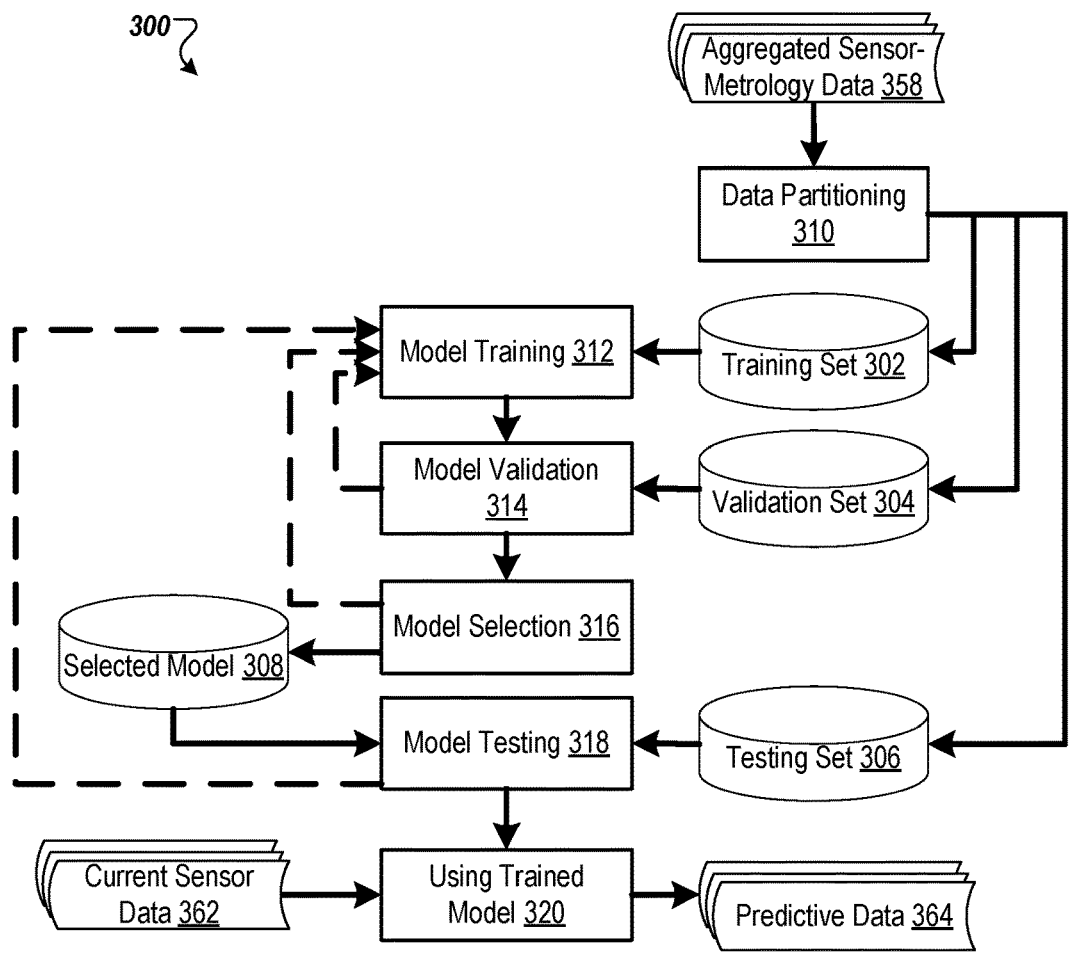
FIG. 3 is a block diagram illustrating determining predicted metrology data, according to certain embodiments.

FIG. 3 is a block diagram illustrating a system 300 for generating predictive data 364 (e.g., predictive data 164 of FIG. 1), according to certain embodiments. The system 300 may be used to determine a corrective action associated with manufacturing equipment 124 based on aggregated sensor-metrology data 358 (e.g., aggregated sensor-metrology data 158 of FIG. 1).

At block 310, the system 300 (e.g., predictive system 110 of FIG. 1) performs data partitioning (e.g., via data set generator 172 of server machine 170 of FIG. 1) of the aggregated sensor-metrology data 358 (e.g., aggregated sensor-metrology data 158 of FIG. 1) to generate the training set 302, validation set 304, and testing set 306. For example, the training set may be 60% of the aggregated sensor-metrology data 358, the validation set may be 20% of the aggregated sensor-metrology data 358, and the validation set may be 20% of the aggregated sensor-metrology data 358. The system 300 may generate a plurality of sets of features for each of the training set, the validation set, and the testing set. For example, if the aggregated sensor-metrology data 358 has sensor data from 20 sensors (e.g., sensors 126 of FIG. 1) and 100 products (e.g., wafers that each correspond to the sensor data from the 20 sensors), a first set of features may be sensors 1-10, a second set of features may be sensors 11-20, the training set may be products 1-60, the validation set may be products 61-80, and the testing set may be products 81-100. In this example, the first set of features of the training set would be sensor data from sensors 1-10 for products 1-60.

At block 312, the system 300 performs model training (e.g., via training engine 182 of FIG. 1) using the training set 302. The system 300 may train multiple models using multiple sets of features of the training set 302 (e.g., a first set of features of the training set 302, a second set of features of the training set 302, etc.). For example, system 300 may train a machine learning model to generate a first trained machine learning model using the first set of features in the training set (e.g., sensor data from sensors 1-10 for products 1-60) and to generate a second trained machine learning model using the second set of features in the training set (e.g., sensor data from sensors 11-20 for products 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 314, the system 300 performs model validation (e.g., via validation engine 184 of FIG. 1) using the validation set 304. The system 300 may validate each of the trained models using a corresponding set of features of the validation set 304. For example, system 300 may validate the first trained machine learning model using the first set of features in the validation set (e.g., sensor data from sensors 1-10 for products 61-80) and the second trained machine learning model using the second set of features in the validation set (e.g., sensor data from sensors 11-20 for products 61-80). In some embodiments, the system 300 may validate hundreds of models (e.g., models with various permutations of features, combinations of models, etc.) generated at block 312. At block 314, the system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 may test, using the first set of features in the testing set (e.g., sensor data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., sensor data from different sensors). Responsive to determining that the selected model 308 has an accuracy that meets a threshold accuracy based on the testing set 306, flow continues to block 320. In at least block 312, the model may learn patterns in the aggregated sensor-metrology data 358 to make predictions and in block 318, the system 300 may apply the model on the remaining data (e.g., testing set 306) to test the predictions.

At block 320, system 300 uses the trained model (e.g., selected model 308) to receive current sensor data 362 (e.g., current sensor data 162 of FIG. 1) and determines (e.g., extracts), from the output of the trained model, predictive data 364 (e.g., predictive data 164 of FIG. 1) to perform corrective actions associated with the manufacturing equipment 124.

In some embodiments, current metrology data (e.g., corresponding to the current sensor data 362) is received from the metrology server (e.g., metrology equipment) and the model 308 is re-trained based on the current sensor data 362 and the current metrology data.

In some embodiments, one or more of the acts 310-322 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

Figure 4A:
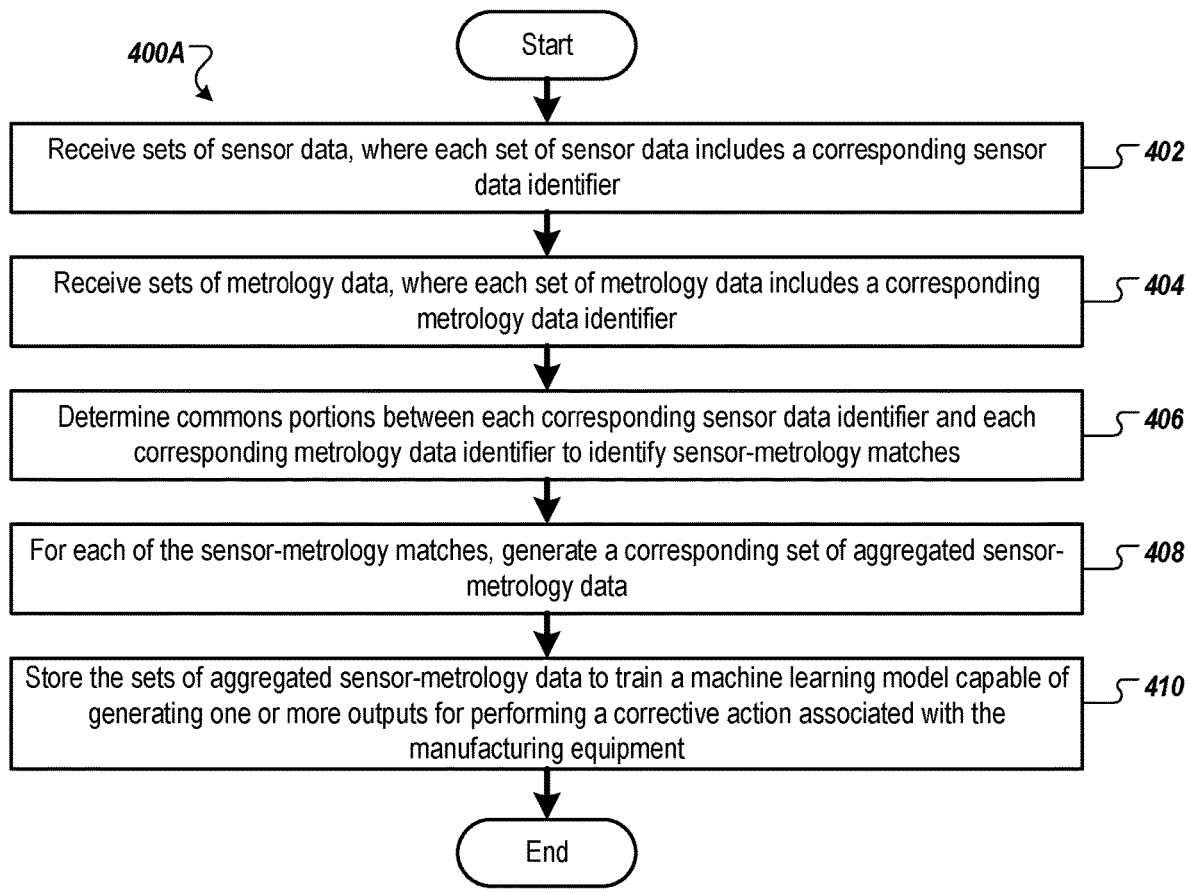
FIG. 4A is a flow diagram of a method of sensor metrology data integration, according to certain embodiments.

FIG. 4A is a flow diagram of a method 400A for sensor metrology data integration, according to certain embodiments. Method 400A may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In one embodiment, method 400A may be performed, in part, by data integration server 102 (e.g., data integration component 104). In some embodiments, a non-transitory storage medium stores instructions that when executed by a processing device (e.g., of data integration server 102) cause the processing device to perform method 400A.

For simplicity of explanation, method 400A is depicted and described as a series of acts. However, acts in accordance with this disclosure can occur in various orders and/or concurrently and with other acts not presented and described herein. Furthermore, not all illustrated acts may be performed to implement the method 400A in accordance with the disclosed subject matter. In addition, those skilled in the art will understand and appreciate that the method 400A could alternatively be represented as a series of interrelated states via a state diagram or events.

Referring to FIG. 4A, at block 402 the processing logic receives sensor data 142 (e.g., from sensor server 122, from data store 140). The sensor data 142 may include multiple sets of sensor data, where each set of sensor data includes sensor values 144 and sensor data identifiers 146 (e.g., LOT_ID). Each sensor data identifier 146 may include a sensor carrier identifier (e.g., FOUP_ID) and a timestamp (e.g., a run date, a run hour, etc. corresponding to when the product was processed by the manufacturing equipment 124). Each set of sensor data (e.g., sensor data identifier 146) may include a corresponding product identifier 148.

In some embodiments, for each set of sensor data 142, the sensor server 122 may receive sensor values 144 from sensors 126 (e.g., associated with manufacturing processes of manufacturing equipment 124 to produce products) and may receive a sensor carrier identifier (e.g., FOUP ID) from sensor identifier reader 128 (e.g., FOUP RFID reader) associated with a product carrier (e.g., FOUP) of the product. For each set of sensor data, the sensor server 122 may generate a sensor data identifier 146 (e.g., LOT_ID) based on the sensor carrier identifier and a timestamp (e.g., by concatenating at least a portion of the sensor carrier identifier and at least a portion of the timestamp). For example, for a sensor carrier identifier of FOUP ID 3044 and a timestamp of Nov. 14, 2018, the sensor server 122 may generate a sensor data identifier 146 of F3044_111418. The joining character could be any character, such as "−," "+," etc. as chosen or convenient for the software architecture.

The sensor data identifiers 146 may be added to files of sensor data 142 as a field or attribute. In some embodiments, the sensor server 122 stores carrier identifier (e.g., FOUP ID) information on files of sensor data 142. In some embodiments, the sensor server 122 auto-creates a unique sensor data identifier 146 (e.g., LotID) based on FOUP_ID plus date stamp plus timestamp.

At block 404, the processing logic receives metrology data 150 (e.g., from metrology server 132, from data store 140). The metrology data 150 may include multiple sets of metrology data, where each set of metrology data includes metrology values 152 and metrology data identifiers 154. Each metrology data identifier 154 may include a metrology carrier identifier (e.g., FOUP ID) and a timestamp (e.g., date, hour, etc. corresponding to when the metrology was measured). Each set of metrology data (e.g., metrology data identifier 154) may include a corresponding product identifier 156.

In some embodiments, for each set of metrology data 150, the metrology server 132 may receive metrology values 152 from metrology equipment 134 (e.g., associated with products produced by manufacturing processes of manufacturing equipment 124) and may receive a metrology carrier identifier (e.g., FOUP ID) from metrology identifier reader 136 (e.g., FOUP RFID reader) associated with a product carrier (e.g., FOUP) of the product. For each set of metrology data, the metrology server 132 may generate a metrology data identifier 154 based on the metrology carrier identifier and a timestamp. For example, for a metrology carrier identifier of F3044 (e.g., that matches the sensor carrier identifier of the corresponding sensor data 142) and a timestamp of Nov. 14, 2018, the sensor server 122 may generate a metrology data identifier 154 of F3044_111418. The metrology data 150 may be saved in a metrology file that has the metrology data identifier 154 (e.g., LOT_ID) and additional contextual information (e.g., product identifier 156, etc.).

In some embodiments, the same product carrier (e.g., FOUP) may be associated with the same product in the sensor system 120 (e.g., processing the wafers) and in the metrology system 130 (e.g., measuring the wafers). For the same product, the sensor carrier identifier and the metrology carrier identifier may be the same carrier identifier.

In some embodiments, the metrology server 132 may determine if the metrology values 152 correspond to a pre-measurement (e.g., metrology values 152 provided before the processing of the products during which the sensor values 144 are obtained) or a post-measurement (e.g., metrology values 152 provided after the processing of the products during which the sensor values 144 are obtained). The metrology server 132 may include in the metrology data identifiers 154 and indication of whether the corresponding metrology values 152 are pre-measurement or post-measurement. For example, the file name of metrology data 150 corresponding to pre-measurements may contain "PRE" and file names without "PRE" may be considered post-measurement.

In some embodiments, the sensor values 144 corresponding to a set of products (e.g., corresponding to the same sensor data identifier 146 and product identifiers 148) are provided from the sensors 126 to the sensor server 122 at a first point in time and the metrology values 152 corresponding to the same set of products (e.g., corresponding to the same metrology data identifier 154 and product identifiers 156) are provided at a second point in time. In some embodiments, the first point in time and the second point in time correspond to the same date (e.g., same date stamp). In some embodiments, the first point in time and the second point in time are the closest points in time for the corresponding carrier identifiers that match (e.g., for the same FOUP ID). In some embodiments, for metrology data 150 that are pre-measurements, the second point in time is the soonest point in time before the first point in time for corresponding carrier identifiers that match (e.g., for the same FOUP ID). In some embodiments, for metrology data 150 that are post-measurements, the second point in time is the soonest point in time after the first point in time for corresponding carrier identifiers that match (e.g., for the same FOUP ID).

The metrology data identifiers 154 (e.g., FOUP ID plus timestamp) may be auto-generated by the metrology server 132. In some embodiments, the metrology data identifiers 154 may be generated by user input. For example, the metrology server 132 may receive a request (e.g., work order) from a user (e.g., process engineer) to access (e.g., view, store, etc.) a set of metrology data 150. The metrology server 132 may transmit the set of metrology data 150 to a centralized database for use by the user. The user may input the metrology data identifier 154 (e.g., FOUP ID plus timestamp, sequence ID) as part of a created filename for the requested metrology data 150. The manually-input metrology data identifier 154 for the filename may also be created by concatenating FOUP ###_DateStamp (e.g., FOUP ID 3044 run on 11/14/2018 having the following string in filename FOUP3044_111418 along with other contextual information). In some embodiments, the processing logic (e.g., via data integration component 104) or the metrology server 132 may use the manually-input metrology data identifier 154 instead of an auto-generated metrology data identifier 154 (e.g., responsive to metrology identifier reader 136 not reading a metrology carrier identifier) or to verify (e.g., spot check) the auto-generated metrology data identifier 154.

At block 406, the processing logic determines common portions (e.g., substrings FOUP3044_111418) between each corresponding sensor data identifier 146 and each corresponding metrology data identifier 154 to identify sensor-metrology matches. In some embodiments, the processing logic searches the sensor server 122 and the metrology server 132 and matches common portions (e.g., substrings FOUP3044_111418) on the sensor server 122 and the metrology server 132.

Each common portion (e.g., substring) may include a corresponding sensor carrier identifier and a corresponding metrology carrier identifier that match (e.g., are the same FOUP ID). Each common portion may include a corresponding sensor timestamp (e.g., run date) and a corresponding metrology timestamp that are most proximate of carrier matches (e.g., are the same day, are the closest points in time, etc.).

In some embodiments, the processing logic identifies a pre-measurement set of metrology data 150 and/or a post-measurement set of metrology data that correspond to a set of sensor data 142. To determine pre-measurement metrology data for a run date (e.g., sensor timestamp) corresponding to a set of sensor data 142, the processing logic determines all sets of metrology data 150 (e.g., metrology files from all metrology equipment 134) that have corresponding timestamps a predetermined amount of time before the run date (e.g., look back five days from the run date, common portions for the run date and the previous five days, etc.), that match the carrier identifier (e.g., same FOUP ID), that match the product identifier 156 (e.g., same slot number), and that are pre-measurements (e.g., have "PRE" in the filenames). The processing logic may select the metrology data 150 with a corresponding timestamp closest before the run date as the pre-measurement metrology data to be linked to the sensor data 142.

To determine post-measurement metrology data for the run date, the processing logic determines all sets of metrology data 150 (e.g., metrology files from all metrology equipment 134) that have corresponding timestamps a predetermined amount of time after the run date (e.g., look forward five days from the run date, common portions for the run date and the subsequent five days, etc.), that match the carrier identifier, match the product identifier 156, and are post-measurements (e.g., do not have "PRE" in the filenames). The processing logic may select the metrology data 150 with a corresponding timestamp closest after the run date as the post-measurement metrology data to be linked to the sensor data 142.

The processing logic may select one or more sets of metrology data 150 (e.g., closest pre-measurement metrology data and closest post-measurement metrology data) to be linked to a set of sensor data 142.

In some embodiments, sensor data 142 is stored by run (e.g., manufacturing process). Each set of sensor data 142 may correspond to the same run. The sensor data 142 may include an identifier of corresponding manufacturing equipment 124 (e.g., tool ID), a identifier of the corresponding manufacturing process (e.g., run ID), a timestamp (e.g., manufacturing process start time, run start time, such as 2018-11-14 5:00:00.000), a sensor data identifier (e.g., lot ID, carrier identifier joined with time stamp, such as F3044_111418), and a manufacturing process identifier (e.g., recipe). An example data structure (e.g., table) of sensor data 142 is shown in Table 1.

TABLE 1

| ToolID | RunID | RunStartTime | LotID | Recipe |
|---|---|---|---|---|
| Tool A | Run 1 | 2018-11-14 5:00:00.000 | F3044_111418 | Recipe A |
| Tool A | Run 3 | 2018-11-14 5:10:00.000 | F3044_111418 | Recipe A |
| Tool B | Run 2 | 2018-11-14 5:00:00.000 | F3044_111418 | Recipe A |
| Tool B | Run 4 | 2018-11-14 5:10:00.000 | F3044_111418 | Recipe A |
| Tool B | Run 5 | 2018-11-14 5:20:00.000 | F3044_111418 | Recipe A |

In some embodiments, metrology data 150 is store in a file that includes a file identifier (e.g., file ID), file name, and a metrology process (e.g., dielectric measurement, ellipsometry, etc.). The file name may include the carrier identifier (e.g., F3044), a timestamp (e.g., 111418) or time range (e.g., 111418-11.15.18), and a product identifier 156 (e.g., indicating a slot number such as "_s1"). An example data structure (e.g., table) of metrology data is shown in Table 2.

TABLE 2

| FileID | FileName | Metrology |
|---|---|---|
| File 1 | Data-F3044_111418-11.15.18-Data_s1.csv | Ellipsometry |
| File 2 | Data-F3044_111418-11.15.18-Data_s2.csv | Ellipsometry |
| File 3 | Data-F3044_111418-11.15.18-Data_s3.csv | Ellipsometry |

TABLE 2-continued

| FileID | FileName | Metrology |
|---|---|---|
| File 4 | Data-F3044__111418-11.15.18-Data__s4.csv | Ellipsometry |
| File 5 | Data-F3044__111418-11.15.18-Data__s5.csv | Ellipsometry |

The processing logic may receive the sensor data 142 from the sensor server 122 and the metrology data 150 (e.g., metrology file data) from the metrology server 132 (e.g., shared folders). The processing logic may identify the common attributes (e.g., carrier identifier, timestamp, portions, substrings, etc.) between the sensor data 142 and the metrology data 150. Because of slot integrity (e.g., products in same order in manufacturing processes and metrology processes), the processing logic may be able to identify the sensor data 142 that corresponds to the product identifiers 156 of the metrology data 150 by the order of the sensor data 142 (e.g., first timestamp of sensor data 142 corresponds to the first product identifier 156). The processing logic may provide a linking between the metrology data 150 (e.g., metrology file) and sensor data 142 (e.g., run data) by associating file identifiers, identifiers of manufacturing equipment, and manufacturing process identifiers. The processing logic may provide a GUI to display the linking information. An example data structure (e.g., table) of the linking between the sensor data 142 and the metrology data 150 is shown in Table 3.

TABLE 3

| FileID | ToolID | RunID |
|---|---|---|
| File 2 | Tool A | Run 1 |
| File 4 | Tool A | Run 3 |
| File 1 | Tool B | Run 2 |
| File 3 | Tool B | Run 4 |
| File 5 | Tool B | Run 5 |

Table 3 shows that the product in slot 2 was processed at 5:00 by tool A, the product in slot 4 was processed at 5:10 by tool A, the product in slot 1 was processed at 5:00 by tool B, the product in slot 3 was processed at 5:10 by tool B, and the product in slot 5 was processed at 5:20 by tool B. The processing logic may generate aggregated sensor-metrology data 158 that includes sensor data 142, metrology data 150, and an indication of common attributes (e.g., similar to or different from the linking attributes in Table 3).

At block 408, for each of the sensor-metrology matches, the processing logic generates a corresponding set of aggregated sensor-metrology data 158 (e.g., aggregated sensor-metrology data structure or data table). Each set aggregated sensor-metrology data 158 may include a respective set of sensor data that corresponds to the corresponding sensor data identifier 146 and a respective set of metrology data that corresponds to the corresponding metrology data identifier 154 (e.g., that are integrated, that are aggregated, that are linked, etc.). For example, an aggregated sensor-metrology data structure may include sensor values 144 (e.g., sensor_1 to sensor_N), product identifier 148 (e.g., wafer_ID), sensor carrier identifier (e.g., FOUP_ID), sensor timestamp (e.g., datestamp, metrology values 152 (e.g., thickness, refractive index (RI), dielectric constant (k), etc.), product identifier 156 (e.g., wafer_ID), metrology carrier identifier (e.g., FOUP_ID), and metrology timestamp (e.g., datestamp), where the product identifier 148 and product identifier 156 match, the sensor carrier identifier and the metrology carrier identifier match, and the sensor timestamp and metrology timestamp match.

The processing logic may join or link files with the product identifier 156 (e.g., Wafer_ID) as a common filed or attribute.

At block 410, the processing logic stores the sets of aggregated sensor-metrology data 158 (e.g., in data store 140, in a database warehouse, in a technical data warehouse, etc.). Each of the sets of aggregated sensor-metrology data 158 may be stored in a corresponding data structure (e.g., in a corresponding table, in a corresponding file, etc.).

In some embodiments, the aggregated sensor-metrology data 158 is stored in a database that is to be searched based on sensor data or metrology data to determine optimal manufacturing parameters (e.g., sensor data corresponding to the searched metrology data) or optimal product property data (e.g., metrology data corresponding to the searched sensor data).

In some embodiments, the aggregated sensor-metrology data 158 (e.g., labeled data) is stored to train a machine learning model 190 (e.g., supervised machine learning) to generate a trained machine learning model. The trained machine learning model may be capable of generating one or more outputs (e.g., artificial intelligence (AI) applications, such as generating predictive data 164 based on input of current sensor data 162) for performing a corrective action associated with the manufacturing equipment 124. The predictive data 164 may predict an outlier (e.g., defect in product, product outside of specification, etc.) without using the metrology system 130. The corrective action may include one or more of causing a GUI to display an alert, interrupting operation of the manufacturing equipment (e.g., stopping the manufacturing equipment 124, stopping a portion of the manufacturing equipment 124, not performing a manufacturing process on the manufacturing equipment 124, etc.), or causing updates to manufacturing parameters of the manufacturing equipment 124.

In some embodiments, the aggregated sensor-metrology data 158 is stored in as catalogued data in a centralized location (e.g., data store 140) for future use. Conventionally, sensor values and metrology values are stored in different locations (e.g., on a user's laptop, etc.). There may be hundreds of sensors (e.g., over 500), so sensor values over time take up a lot of storage capacity (e.g., on a user's laptop) and may eventually be discarded. Method 400A may be used to generate and store aggregated sensor-metrology data 158 over long periods of time (e.g., months, years) to be used for later analysis (e.g., generating predictive data, predicting updates to manufacturing parameters to meet target property data, predict component failure, improving processes and equipment, performing historical analysis, etc.).

The processing logic may generate the sets of aggregated sensor-metrology data 158 without user input of manually associating the sensor values 144 and the metrology values 152. The processing logic may generate the sets of aggregated sensor-metrology data 158 without using an OCR system. The sensor server 122 may generate the sensor data 142 without manual user input and without using an OCR system. The metrology system 130 may generate the metrology data 150 without manual user input and without using an OCR system.

In some embodiments, each product carrier has multiple slots that carry a product (e.g., wafer) and slot integrity (e.g., order of the product in the slots) may be maintained when the products are processed by the manufacturing equipment 124 (e.g., on chambers) and are sent for metrology measurements by the metrology equipment 134 (e.g., the first product to be processed by the manufacturing equipment 124 is the first product to be measured by the metrology equipment 134).

Figure 4B:
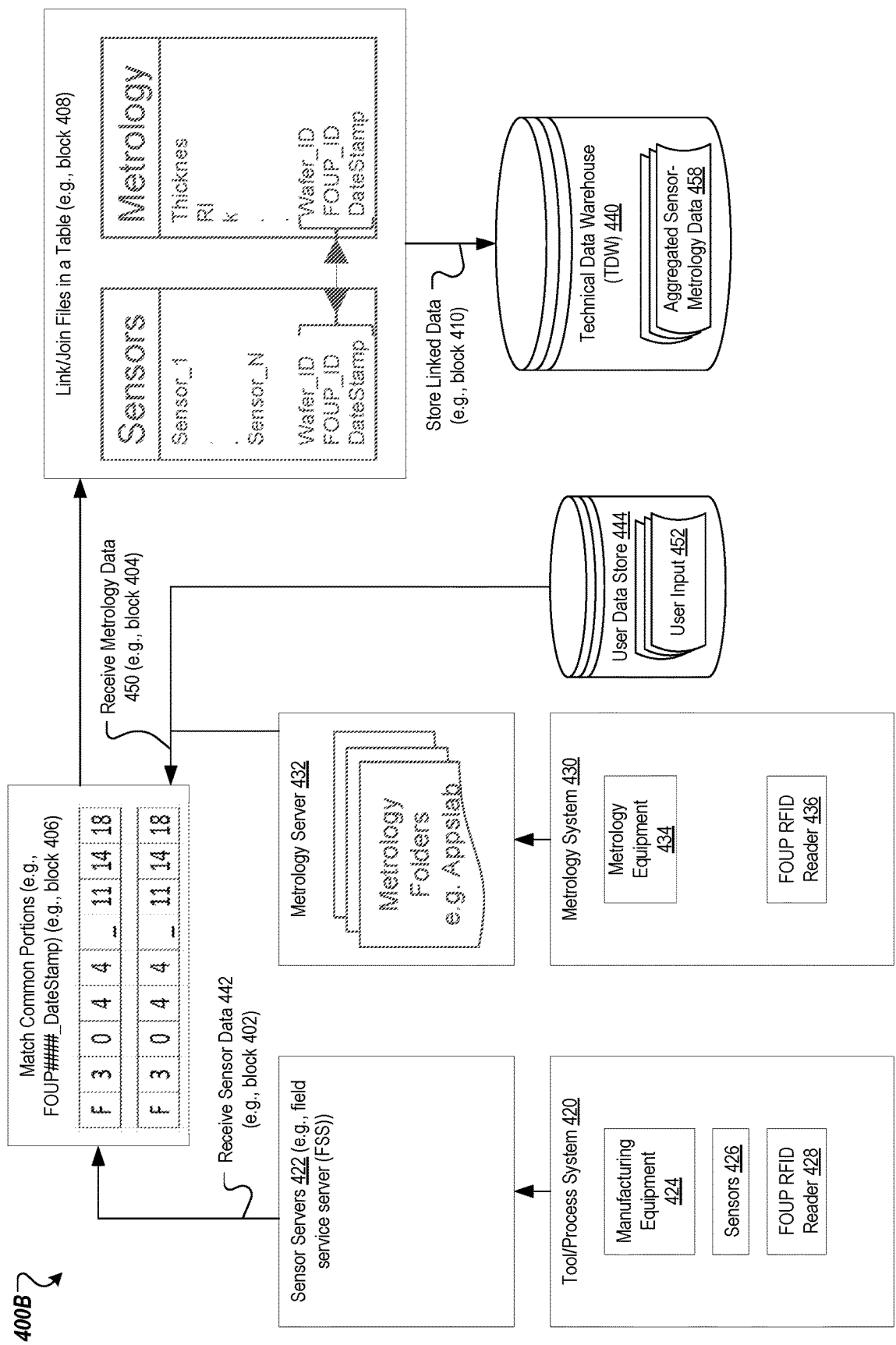
FIG. 4B is a block diagram of sensor metrology data integration, according to certain embodiments.

FIG. 4B is a block diagram 400B of sensor metrology data integration, according to certain embodiments. Portions of block diagram 400B may be the similar or the same as blocks of method 400A of FIG. 4A.

Block diagram 400B may include sensor servers 422 (e.g., FSS, sensor server 112 of FIG. 1), a tool/process system 420 (e.g., sensor system 120 of FIG. 1), metrology system 430 (e.g., metrology system 130 of FIG. 1), a technical data warehouse (TDW) 440 (e.g., data store 140 of FIG. 1), and a user data store 444. The tool/process system 420 may include manufacturing equipment 424 (e.g., manufacturing equipment 124 of FIG. 1), sensors 426 (e.g., sensors 126 of FIG. 1), and a FOUP RFID reader 428 (e.g., sensor identifier reader 128 of FIG. 1). The metrology system 430 may include metrology equipment 434 (e.g., metrology equipment 134 of FIG. 1) and FOUP RFID reader 436 (e.g., metrology identifier reader 136 of FIG. 1).

The sensor servers 422 may receive sensor values 144 and sensor data identifiers 146 from tool/process system 420 to generate sensor data 442 (e.g., sensor data 142 of FIG. 1). The metrology server 432 (e.g., metrology folders, such as Appslab) may receive metrology values 152 and metrology data identifiers 154 from the metrology system 130 to generate metrology data 450 (e.g., metrology data 150 of FIG. 1).

The data integration server 102 (e.g., via data integration component 104) may receive the sensor data 442 (e.g., see block 402) and the metrology data 450 (e.g., see block 404). In some embodiments, the data integration server 102 may receive user input 452 (e.g., that was manually input) of a FOUP ID and DateStamp from a user data store 444. The user input 452 may include manual entry of metrology data identifiers 154. The data integration server 102 may compare the metrology data 450 received from metrology server 432 with the user input 452 to verify accuracy (e.g., spot check) the metrology data 450.

The data integration server 102 may match common portions (e.g., substrings FOUP ####_DateStamp) (e.g., see block 406). The data integration server 102 may link/join files in a data structure (e.g., data table) (e.g., block 408) based on the common portions and the data integration server 102 may store the linked data as aggregated sensor-metrology data 458 (e.g., aggregated sensor-metrology data 158 of FIG. 1) in the TDW 440.

Figure 5:
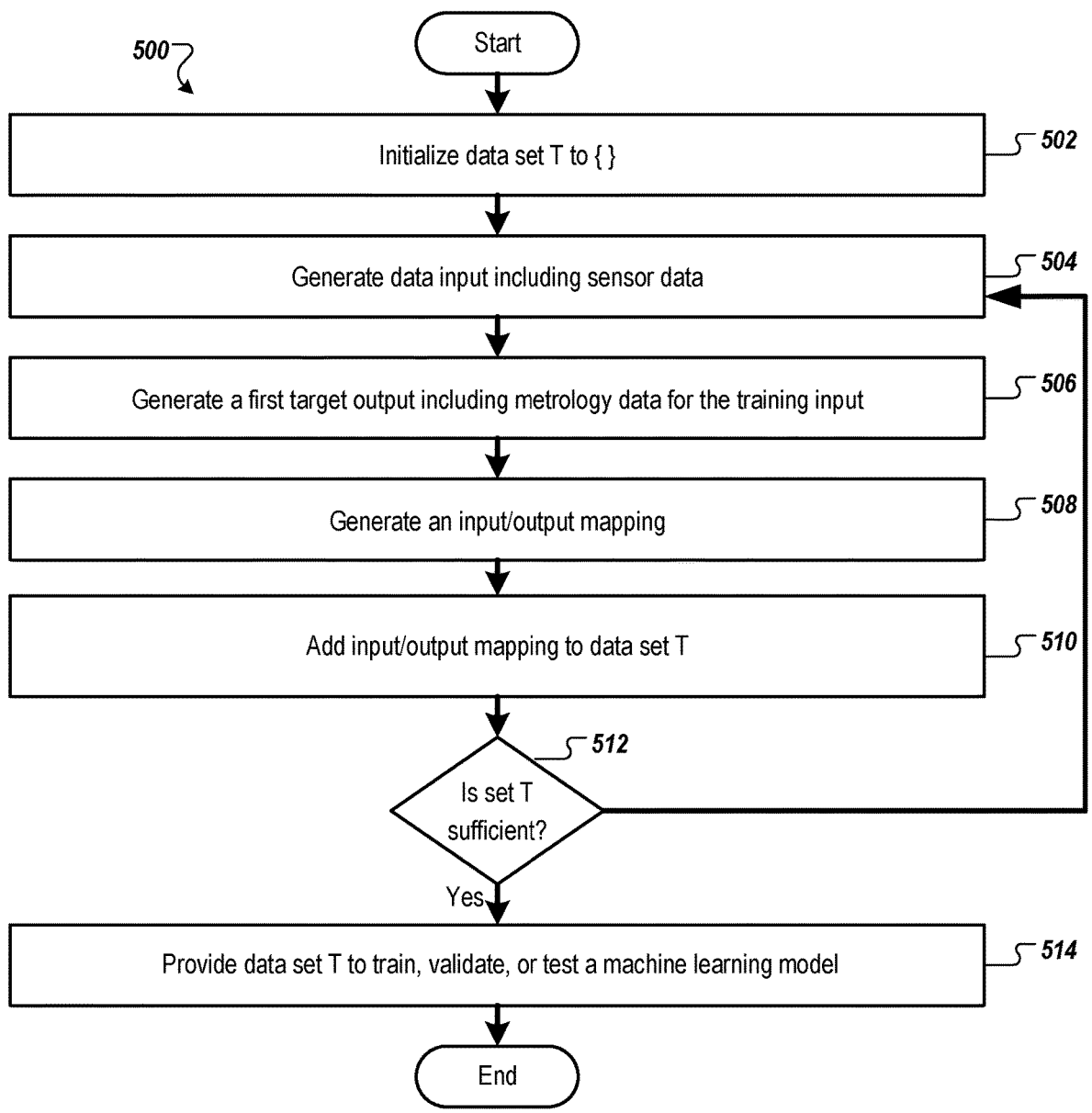
FIG. 5 is a flow diagram of a method for generating a data set for a machine learning model for predicting metrology data, according to certain embodiments.

FIG. 5 is a flow diagram of a method 500 for generating a data set for a machine learning model for predicting metrology data (e.g., predictive data 164 of FIG. 1), according to certain embodiments. Methods 500 may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 500 may be performed, in part, by predictive system 110 (e.g., server machine 170, data set generator 172, etc.). Predictive system 110 may use method 500 to at least one of train, validate, or test a machine learning model, in accordance with embodiments of the disclosure. In some embodiments, one or more operations of method 500 may be performed by data set generator 172 of server machine 170 as described with respect to FIGS. 1 and 2. It may be noted that components described with respect to FIGS. 1 and 2 may be used to illustrate aspects of FIG. 5. In some embodiments, a non-transitory storage medium stores instructions that when executed by a processing device (e.g., of predictive system 110) cause the processing device to perform method 500.

For simplicity of explanation, method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

Referring to FIG. 5, in some embodiments, at block 502 the processing logic implementing method 500 initializes a training set T to an empty set.

At block 504, processing logic generates first data input (e.g., first training input, first validating input) that includes sensor data (e.g., sensor data 142 of FIG. 1, sensor data 242 of FIG. 2). In some embodiments, the first data input may include a first set of features for types of sensor data and a second data input may include a second set of features for types of sensor data (e.g., as described with respect to FIG. 2). The processing logic may generate the data input based on the aggregated sensor-metrology data 158 (e.g., extracting the sensor data 142 from a data structure or table of aggregated sensor-metrology data 158).

At block 506, processing logic generates a first target output for one or more of the data inputs (e.g., first data input). The first target output may be corresponding metrology data (e.g., metrology data 150 of FIG. 1, metrology data 250 of FIG. 2, metrology data 250 of FIG. 3). The processing logic may generate the target output based on the aggregated sensor-metrology data 158 (e.g., extracting the metrology data 150 from the same data structure or table of aggregated sensor-metrology data 158 from which the sensor data of the data input was extracted).

At block 508, processing logic optionally generates mapping data that is indicative of an input/output mapping. The input/output mapping (or mapping data) may refer to the data input (e.g., one or more of the data inputs described herein), the target output for the data input (e.g., where the target output identifies metrology data 150), and an association between the data input(s) and the target output. The mapping data may be based on the common data structure or table of aggregated sensor-metrology data 158 from which the data input and the target output were extracted.

At block 510, processing logic adds the mapping data generated at block 510 to data set T.

At block 512, processing logic branches based on whether data set T is sufficient for at least one of training, validating, and/or testing machine learning model 190. If so, execution proceeds to block 514, otherwise, execution continues back at block 504. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 514, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 514, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by predictive component 114 (of predictive server 112) to generate predictive data 164 for performing corrective action associated with the manufacturing equipment 124.

Figure 6:
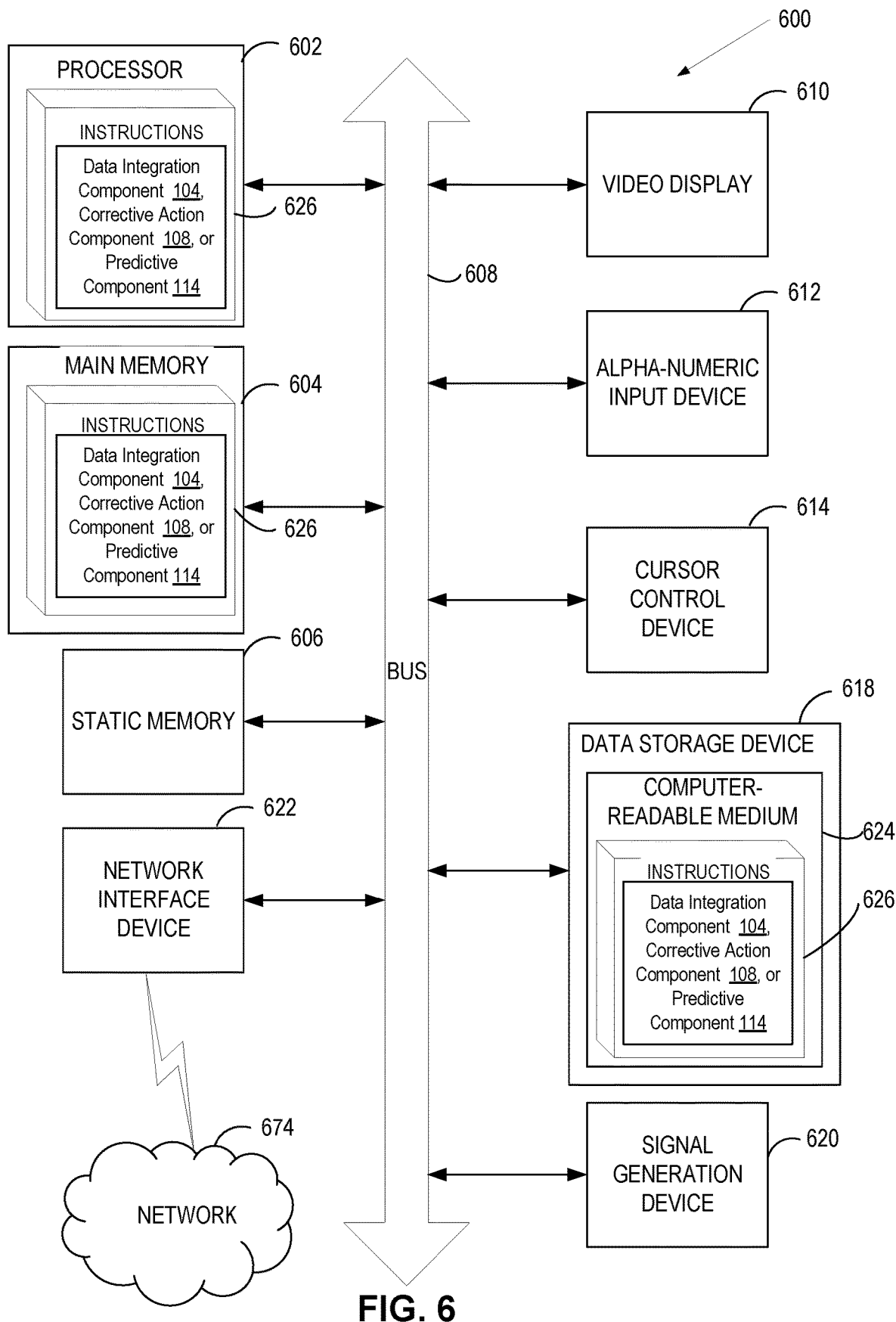
FIG. 6 is a block diagram illustrating a computer system, according to certain embodiments.

FIG. 6 is a block diagram illustrating a computer system 600, according to certain embodiments. In some embodiments, computer system 600 may be connected (e.g., via a network 674, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment (e.g., via network 674). Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622 (e.g., that communicates with network 674). Computer system 600 also may include a video display unit 610 (e.g., an LCD), an alphanumeric input device 612 (e.g., a keyboard), a cursor control device 614 (e.g., a mouse), and a signal generation device 620.

In some implementations, data storage device 618 may include a non-transitory computer-readable storage medium 624 on which may store instructions 626 encoding any one or more of the methods or functions described herein, including instructions encoding components of FIG. 1 (e.g., data integration component 104, corrective action component 108, predictive component 114, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "generating," "storing," "causing," "training," "interrupting," "selecting," "providing," "displaying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving a plurality of sets of sensor data, wherein each set of sensor data comprises corresponding sensor values associated with producing corresponding product by manufacturing equipment and a corresponding sensor data identifier;
receiving a plurality of sets of metrology data, wherein each set of metrology data comprises corresponding metrology values associated with the corresponding product manufactured by the manufacturing equipment and a corresponding metrology data identifier;
determining common portions between each corresponding sensor data identifier and each corresponding metrology data identifier to identify sensor-metrology matches;
for each of the sensor-metrology matches, generating a corresponding set of aggregated sensor-metrology data that comprises a respective set of sensor data that corresponds to the corresponding sensor data identifier and a respective set of metrology data that corresponds to the corresponding metrology data identifier to generate a plurality of sets of aggregated sensor-metrology data; and
storing the plurality of sets of aggregated sensor-metrology data to train a machine learning model to provide a trained machine learning model, wherein the trained machine learning model is capable of generating one or more outputs for performing a corrective action associated with the manufacturing equipment.

2. The method of claim 1, wherein, for each of the plurality of sets of sensor data, the corresponding sensor data identifier comprises a corresponding sensor carrier identifier and a corresponding sensor timestamp, and wherein, for each of the plurality of sets of metrology data, the corresponding metrology data identifier comprises a corresponding metrology carrier identifier and a corresponding metrology timestamp.

3. The method of claim 2, wherein each common portion of the common portions comprises:
the corresponding sensor carrier identifier and the corresponding metrology carrier identifier that match; and
the corresponding sensor timestamp and the corresponding metrology timestamp that are most proximate of a plurality of carrier matches.

4. The method of claim 3, wherein, for each of the plurality of sets of sensor data, the corresponding sensor data identifier further comprises a corresponding product identifier, and wherein, for each of the plurality of sets of metrology data, the corresponding metrology data identifier further comprises the corresponding product identifier, wherein each of the sensor-metrology matches comprises matching product identifiers.

5. The method of claim 1, wherein each of the plurality of sets of aggregated sensor-metrology data is stored as a table.

6. The method of claim 1, wherein the plurality of sets of metrology data correspond to historical property data of products, and wherein the one or more outputs of the trained machine learning model comprises predicted property data.

7. The method of claim 1, wherein the corrective action comprises one or more of:
causing a graphical user interface to display an alert;
interrupting operation of the manufacturing equipment; or
causing updates to manufacturing parameters of the manufacturing equipment.

8. A system comprising:
a memory; and
a processing device, coupled to the memory, to:
receive a plurality of sets of sensor data, wherein each set of sensor data comprises corresponding sensor values associated with producing corresponding product by manufacturing equipment and a corresponding sensor data identifier;
receive a plurality of sets of metrology data, wherein each set of metrology data comprises corresponding metrology values associated with the corresponding product manufactured by the manufacturing equipment and a corresponding metrology data identifier;
determine common portions between each corresponding sensor data identifier and each corresponding metrology data identifier to identify sensor-metrology matches;
for each of the sensor-metrology matches, generate a corresponding set of aggregated sensor-metrology data that comprises a respective set of sensor data that corresponds to the corresponding sensor data identifier and a respective set of metrology data that corresponds to the corresponding metrology data identifier to generate a plurality of sets of aggregated sensor-metrology data; and
store the plurality of sets of aggregated sensor-metrology data to train a machine learning model to provide a trained machine learning model, wherein the trained machine learning model is capable of generating one or more outputs for performing a corrective action associated with the manufacturing equipment.

9. The system of claim 8, wherein, for each of the plurality of sets of sensor data, the corresponding sensor data identifier comprises a corresponding sensor carrier identifier and a corresponding sensor timestamp, and wherein, for each of the plurality of sets of metrology data, the corresponding metrology data identifier comprises a corresponding metrology carrier identifier and a corresponding metrology timestamp.

10. The system of claim 9, wherein each common portion of the common portions comprises:
the corresponding sensor carrier identifier and the corresponding metrology carrier identifier that match; and
the corresponding sensor timestamp and the corresponding metrology timestamp that are most proximate of a plurality of carrier matches.

11. The system of claim 10, wherein, for each of the plurality of sets of sensor data, the corresponding sensor data identifier further comprises a corresponding product identifier, and wherein, for each of the plurality of sets of metrology data, the corresponding metrology data identifier further comprises the corresponding product identifier, wherein each of the sensor-metrology matches comprises matching product identifiers.

12. The system of claim 10, wherein each of the plurality of sets of aggregated sensor-metrology data is stored as a table.

13. The system of claim 10, wherein the plurality of sets of metrology data correspond to historical property data of products, and wherein the one or more outputs of the trained machine learning model comprises predicted property data.

14. The system of claim 10, wherein the corrective action comprises one or more of:
- causing a graphical user interface to display an alert;
- interrupting operation of the manufacturing equipment; or
- causing updates to manufacturing parameters of the manufacturing equipment.

15. A non-transitory computer readable medium having instructions stored thereon, which, when executed by a processing device, cause the processing device to:
- receive a plurality of sets of sensor data, wherein each set of sensor data comprises corresponding sensor values associated with producing corresponding product by manufacturing equipment and a corresponding sensor data identifier;
- receive a plurality of sets of metrology data, wherein each set of metrology data comprises corresponding metrology values associated with the corresponding product manufactured by the manufacturing equipment and a corresponding metrology data identifier;
- determine common portions between each corresponding sensor data identifier and each corresponding metrology data identifier to identify sensor-metrology matches;
- for each of the sensor-metrology matches, generate a corresponding set of aggregated sensor-metrology data that comprises a respective set of sensor data that corresponds to the corresponding sensor data identifier and a respective set of metrology data that corresponds to the corresponding metrology data identifier to generate a plurality of sets of aggregated sensor-metrology data; and
- store the plurality of sets of aggregated sensor-metrology data to train a machine learning model to provide a trained machine learning model, wherein the trained machine learning model is capable of generating one or more outputs for performing a corrective action associated with the manufacturing equipment.

16. The non-transitory computer readable medium of claim 15, wherein, for each of the plurality of sets of sensor data, the corresponding sensor data identifier comprises a corresponding sensor carrier identifier and a corresponding sensor timestamp, and wherein, for each of the plurality of sets of metrology data, the corresponding metrology data identifier comprises a corresponding metrology carrier identifier and a corresponding metrology timestamp.

17. The non-transitory computer readable medium of claim 16, wherein each common portion of the common portions comprises:
- the corresponding sensor carrier identifier and the corresponding metrology carrier identifier that match; and
- the corresponding sensor timestamp and the corresponding metrology timestamp that are most proximate of a plurality of carrier matches.

18. The non-transitory computer readable medium of claim 17, wherein, for each of the plurality of sets of sensor data, the corresponding sensor data identifier further comprises a corresponding product identifier, and wherein, for each of the plurality of sets of metrology data, the corresponding metrology data identifier further comprises the corresponding product identifier, wherein each of the sensor-metrology matches comprises matching product identifiers.

19. The non-transitory computer readable medium of claim 15, wherein each of the plurality of sets of aggregated sensor-metrology data is stored as a table.

20. The non-transitory computer readable medium of claim 15, wherein the plurality of sets of metrology data correspond to historical property data of products, and wherein the one or more outputs of the trained machine learning model comprises predicted property data.

* * * * *